April 10, 1951 L. OCHTMAN 2,548,269
ACTUATOR FOR CLUTCHES
Filed April 30, 1947
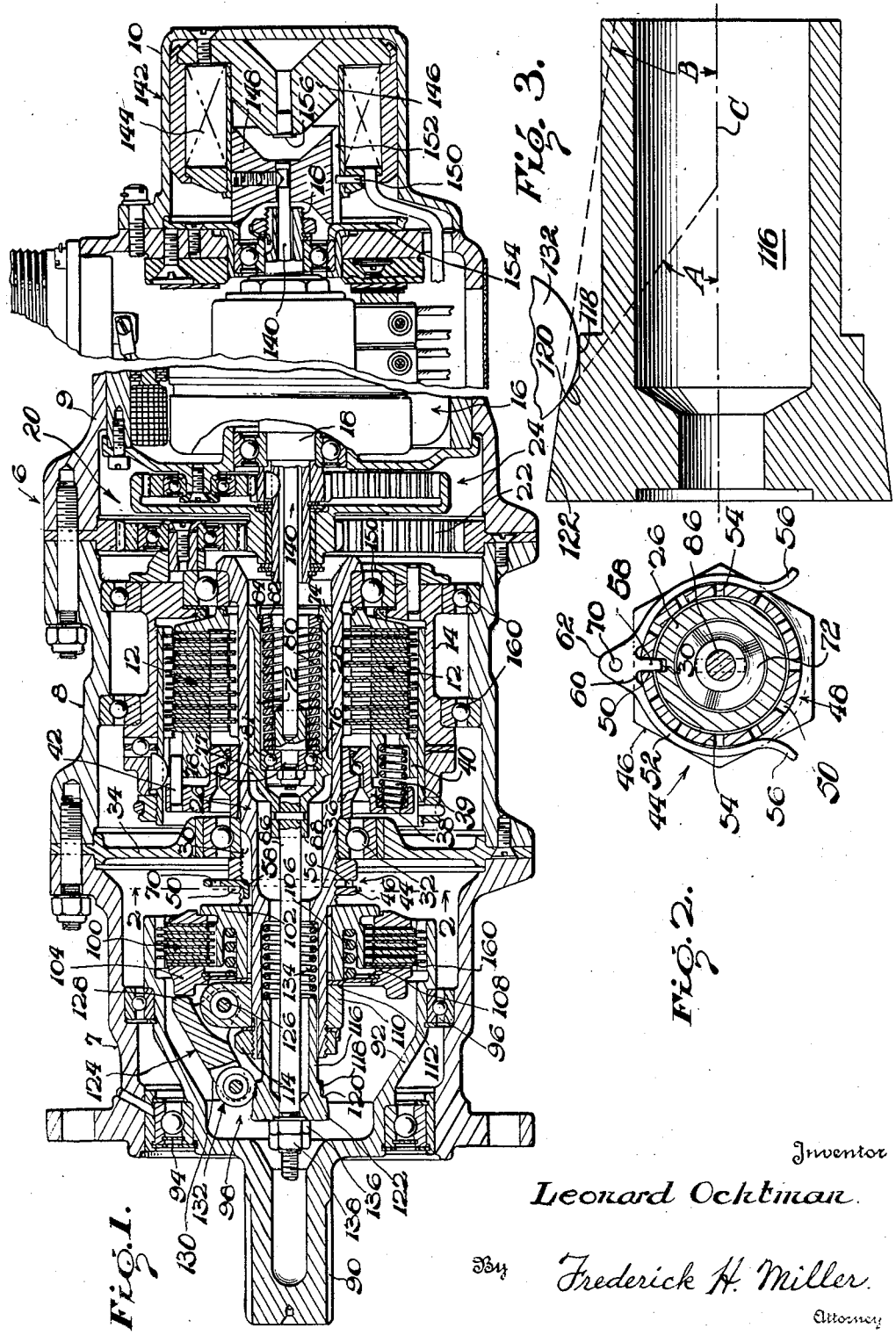
Inventor
Leonard Ochtman
By Frederick H. Miller
Attorney Patented Apr. 10, 1951

2,548,269

UNITED STATES PATENT OFFICE 2,548,269

ACTUATOR FOR CLUTCHES

Leonard Ochtman, Ridgewood, N. J., assignor to Bendix Aviation Corporation, Teterboro, N. J., a corporation of Delaware Application April 30, 1947, Serial No. 745,027

4 Claims. (Cl. 192—40)

The invention hereof relates to actuators particularly adapted to employment in aircraft for raising and lowering landing gear and wheels.

Aircraft of certain types require very fast and positive lowering of the wheels, preferably by gravity.

An actuator connected to the landing gear mechanism must first unlock the gear from its "up" position, by a turn or two of its output shaft, then be immediately disconnected from rotative engagement as the wheels drop by gravity.

Otherwise, the high speed of rotation caused by the rapid drop will exceed a safe speed of the motor and gearing.

Mechanisms previously employed for breaking such engagement, such as those embodying jaw clutches, do not release rapidly enough, or may fail to release at all, if the torque, applied to the jaws by acceleration of the landing gear, exceeds the torque under which the mechanism will function.

Among the objects of the invention are to overcome the above-mentioned and other disadvantages of former actuators and to do so by novel effective means.

Another object is to provide means adapted to actuate a clutch through, and to load, yieldable or spring means, and to be operated by a force exceeding the load causing the clutch to remain effectively clutched to transmit the required torque irrespective of variations in such force.

Another object is to provide such actuating means in the form of an electro-responsive device, in which the clutch is maintained clutched irrespective of voltage variations.

Another object is to provide a bearing through, or by the intermediary of, which a torque limiting or clutch device may be adjusted.

Another object is to provide novel nut and lock means adapted for operation in an actuator or other apparatus.

Another object is to correlate the means, causing the clutch to remain closed irrespective of variations in the force or voltage initiating the clutching action, with the adjusting means operating through the bearing, and with the nut and lock means, whereby to ensure rapid response in clutching and declutching, facilitate assembly and adjustment, conserve space and material, and provide other advantages.

Another object is to provide means of the above-indicated character that are simple and durable in construction, economical to manufacture, and effective in their operation.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a fragmentary side view, partially in section and partially in elevation, of an actuator embodying the features of the invention;

Figure 2 is a detail view, taken substantially along the line 2—2 of Figure 1 of one of the inventive features; and Figure 3 is an enlarged detail view of parts as shown near the left hand end of Figure 1.

Referring paticularly to Figure 1, the device comprises a housing 6, including portions 7, 8, 9 and 10, respectively, separably connected to each other, a torque limiting friction disc pack 12, a drum 14 surrounding the pack 12, a reversible electric motor 16 including a hollow shaft 18, and a gear train 20 having two stages 22 and 24 of reduction gearing between adjacent ends of the drum 14 and the motor shaft 18.

In combination with the aforesaid elements, the invention comprises a hollow member or pack shaft 26 having a length 28 in the pack and an axial keyway 30, discs of the pack 12 being non-rotatively axially movably connected to the drum 14 and the shaft length 28, respectively.

A pack shaft bearing 32 is axially slidable in a partition 34 between the portions 7 and 8 of the housing 6, and is adapted for movement to the right, as viewed in the drawing, for action, through bearings 36 and 38, springs 39 and a ring 40, adjusting the friction between the discs of the pack 12, pins 42 being provided to provide for axial relative movement, but to prevent relative turning, between the bearing 38 and the ring 40.

Means 44, see also Figure 2, comprises a nut 46 adapted for cooperation with the pack shaft member 26, and including outer groove means 48 directed peripherally or extending annularly about the nut, and radial aperture means, such as the twelve apertures 50, shown in this instance.

A resilient sheet-material split ring 52, as of metal, has an inner perimeter 54 of more than half the peripheral extent of the nut 46 at the bottom of the groove means 48, and comprises ends 56 flaring outwardly from the perimeter 54 adapting the ring 52 for radial slip mounting in, and removal from the groove means 48 about the nut. The ring 52 also comprises a radially inwardly extending substantially central key portion 58, of axial L-section intersecting the ring through rounded cut outs 60 of the inner perimeter 54, and adapted to enter any one of the radial apertures 50 and the keyway 30. The ring 52 further embodies an outwardly extending ring manipulating portion 62 opposite the key 58 and having a tool-receiving opening 70.

A coupling housing 72, of substantially cup-shape axially movable in the pack shaft 26, has an open end 74 facing the motor 16, and encloses an axially slidable bearing 76 normally engaging a shoulder 77 of the housing 72 and including a member or inner race 78, which is held against turning as will further appear.

A preloaded compression spring 80 is disposed in the coupling housing 72 between an outer or rotatable member 81 of the bearing 76 and a spring backing ring 82 held by a lock ring 84 in a groove of the coupling housing 72 adjacent to the open end 74 of the latter. A rod 86 extends from a closed, or left hand, end 88 of the coupling housing 72 through the other, or left hand end of the pack shaft 26.

An output shaft 90, for attachment to an element or mechanism to be driven, is provided with a barrel 92 journaled, as by bearings 94 and 96 in the housing portion 7.

A disconnect clutch 98 comprises a disc pack 100, discs of which are non-rotatively axially movably connected respectively to the barrel 92 and to a hub 102 on the pack shaft 26. A clutch pressure ring 104 is biased toward pressure release position, to the left, as shown, by a spring 106 in the hub 102 acting through a plate 108.

A lever mounting ring 110, on the pack shaft 26, is adjusted relative to the hub 102, as by shim means 112 and a nut 114, the shim means, as shown in this example, being of thin single-sheet washer-like form.

A clutch operating hollow member 116, see also Figure 3, movably telescopes the pack shaft 26 around the rod 86, and is provided near the other, or adjacent, end of the pack shaft, with a cylindrical portion 118 and successively, from the portion 118, with a short conical step 120 at a given angle A, and a long step 122 of less angle B, to the pack shaft axis C.

Levers 124, of which there are three in this instance, are pivotally mounted, as by pins 126, on the lever ring 110, are each provided with an arm 128 engaging the clutch pressure ring 104, and an arm 130 carrying a roller 132 adapted to a roll along the steps 120 and 122.

A spring 134, in the pack shaft 26, biases the clutch operating member 116 outwardly of the adjacent pack shaft end, and means, such as nut and lock nut members 136 and 138, respectively, back the operating member 116 against the action of the spring 134 in position holding the rollers 132 on the cylindrical portion 118, with the clutch pressure ring 104 released.

A clutch operating rod 140, is fixed to the non-rotatable member 78 and axially movable in the motor and pack shafts 18 and 26, respectively.

A solenoid 142, in the housing portion 10, includes a coil 144 simultaneously energizable with the motor 16, a stationary pole element 146, and an axially movable pole element 148 fixed to the operating rod 140, and prevented from turning, as by a pin 150 in a slot 152. The movable pole member 148 is limited in its movement to the left by a plate 154, and to the right by a non-magnetic member 156 defining a minimum flux gap between the elements 146 and 148.

As viewed in Figure 1, the pack shaft 26 is journaled at the right, as by a bearing 158 in the drum 14, which, in turn is journaled by bearings 160 between the drum and the housing portion 8, each of which features is arranged as in a former actuator, in which the shaft 26 is not otherwise journaled, except at the position of the bearing 94.

By the provision of the partition 34, which is new in the present structure, the shaft 26, the pack 12 and other parts are more compactly supported, and the structure improved generally, in which advantages are made possible by the axially slidable bearing 32 and the structure better seen in Figures 2 and 3. The bearing 32 facilitates adjustment of the pack 12, and the novel ring 52 may be readily mounted in the narrow space between the partition 34 and the clutch pack 100, by a simple slip or snap action, and withdrawn with a single pull by using a tool in the opening 70 and pulling the tool.

In operation, the output shaft 90 is mechanically disengaged from the driving mechanism, except when electric current is applied to the motor 16 and the solenoid coil 144, which are energized at the same time.

When the solenoid coil 144 is energized, the pole element or plunger 148 pulls through the rod 140, the preloaded spring 80 and the rod 86 to move the clutch operating member 116 axially to the right, during which the rollers 132 ride from the cylindrical portion 118, up the short step 120 to the long step 122. This action causes the nose 128 of each lever 124 to press against the clutch pressure ring 104, by which pressure is applied to the pack 100 for frictional driving engagement of the discs.

When the pull on the rod 140 reaches the preset value of the spring 80, the plunger 148 continues to move by compressing the spring further, until the plunger 148 engages the non-magnetic member or stop button 156. In the latter position, the solenoid gap is so small that the available pull considerably exceeds the load on the spring 80. Thus, the solenoid plunger 148 will remain "home" and maintain the full required pressure on the clutch pack 100, irrespective of variations in the force applied to the rod 140 and of fluctuation of the voltage applied to the coil 144 during the operating cycle.

When the current is cut off, immediate release of the pressure on the clutch pack 100 is effected, first through the action of the spring 80, which is highly loaded and causes the plunger 148 to move from its home position with a snap action, and second, through the spring 134, which moves the operating member 116 and associated parts back to disengaged position. In the latter position, the rollers 132 rest on the cylindrical portion 118, the pressure ring 104 is maintained in contact with the levers 124 by the action of the spring 106 through the plate 108, and a clearance gap is formed, as at a position 160, between the ring 104 and the clutch pack 100. The pack discs are then free to slip, and no driving connection exists between the pack shaft 26 and the output shaft 90, in the positions of the parts shown.

Initial adjustment of the clutch 98 is effected by the shim means 112, which is clamped by the nut 114 between the clutch hub 102 and the lever ring 110. The thickness of the shim means 112 is adjusted so that the required clearance provided by the gap at the position 160 is obtained when the rollers 132 are in contact with the cylindrical portion 118 of the clutch operating member 116. Final adjustment is effected by moving the member 116 along the rod 86 by adjusting and lock nuts 136 and 138 until rapid rise portion 120 is practically in contact with the rollers 132. In this "off" position, the axial locations of the rod 86 and associated parts are maintained by contact of the plunger 148 with the plate 154. The spring 134 holds the assembly in the latter position.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. The combination of a housing, a friction disc pack, a drum, a pack shaft having a length in the pack and an axial keyway, discs of the pack non-rotatively axially movably connected to the drum and said length, respectively, a housing partition, a pack shaft bearing axially slidable in said partition, means including a nut having a peripheral groove and radial apertures and adjustably fixed on the pack shaft and operating through said bearing for adjusting the pressure between the pack discs, a split snap ring having outwardly rounded ends adapting it for slip mounting in and removal from said annular groove and including an inner central key adapted to enter one of said radial apertures and said keyway and having a tool receiving portion, a coupling of substantially cup-shape axially movable in the pack shaft, a second axially slidable bearing disposed in the coupling including a non-rotative member, a preloaded compression spring between the coupling and a rotatable member of said latter bearing, a rod extending from the closed end of the coupling, an output shaft having a barrel, a pack shaft hub, a clutch having discs non-rotatively axially movably connected to the barrel and the hub, respectively, a clutch pressure ring, a pressure ring release spring, a lever mounting ring on the pack shaft, shim means between the hub and the lever ring, means holding the lever ring relative to said shim means, a clutch operating member telescoping the pack shaft around said rod having a cylindrical portion near said other pack shaft end and successively from said cylindrical portion a short conical step at a given angle and a long step of less angle to the pack shaft axis, levers each pivoted on the lever ring having an arm engaging the pressure ring and an arm carrying a roller adapted to roll along said steps, a spring in the pack shaft biasing said operating member outwardly of said other end of the pack shaft, means backing the operating member against the latter spring in position holding the rollers opposite said cylindrical portion and the pressure ring released, a clutch operating rod fixed to said non-rotative member, and axially movable in said pack shaft, a solenoid including a stationary pole element, an axially movable non-rotative armature element fixed to said operating rod, and a non-magnetic member defining a minimum flux gap between said elements.

2. The combination of a driven member, a shaft, torque limiting means between the driven member and the shaft, an axially movable coupling in the shaft, an axially slidable bearing in the coupling including a non-rotative element, a preloaded compression spring between said bearing and said coupling, a rod extending from said coupling through an end of the shaft, an output member, a clutch including elements on the shaft and the output member, respectively, spring means biasing said elements apart, a lever mounting member on the shaft, shim means between the lever mounting member and the shaft clutch element, means holding the lever mounting member relative to said shim means, a member telescoping the shaft around said second rod having a cylindrical portion outside the other end of the shaft and successively from said cylindrical portion conical steps of high and low angularity, respectively, and diverging from the shaft axis, at least one lever pivoted on the lever mounting member between an arm of the lever adapted to press the clutch elements together and a clutch control arm of the lever adapted to engage and travel along said steps, a spring operating between the shaft and said telescoping member biasing the latter outwardly of said shaft other end, means backing the telescoping member against the latter spring in position holding said step engaging arm on the cylindrical portion and the clutch elements released, an axially movable clutch operating rod fixed to said non-rotative element, a solenoid including a stationary pole element, an axially movable non-rotative armature element fixed to the latter rod, and a non-magnetic member defining a minimum flux gap between said elements, the pull of said solenoid exceeding the load on said first spring and the arrangement causing said armature to remain home irrespective of voltage variations within predetermined limits in the solenoid circuit during the operating cycle.

3. The combination of a plurality of rotatable members, a clutch including elements normally biased to declutched relation and connected to two of said members, respectively, one of said members having an axial keyway, a support, adjustable means at one side of said support, bearing means for said one member supported by the support, a nut movable on said one member at the other side of said support acting through said bearing for adjusting said adjustable means and including outer groove means directed peripherally about the nut and radial apertures, a resilient split ring having an inner perimeter of more than half the peripheral extent of the nut at the bottom of the groove means comprising ends flaring outwardly from said inner perimeter adapting the ring for radial slip mounting on and removal from the groove means about the nut and including a radially inwardly extending key adapted to enter any one of said apertures and the keyway, a clutch operating member having portions adapted to operate the clutch to clutching and declutching conditions, respectively, movable means cooperating between said portions and the clutch, means normally biasing said operating member toward position in which said movable means is located on said declutching portion, a coupling connected to said operating member, preloaded yieldable means, and a clutch actuator adapted to actuate said operating member through and to further load said yieldable means and to be operated by a force exceeding the preload force of the yieldable means causing the clutch to remain clutched irrespective of variations in said force above a predetermined minimum.

4. The combination of a hollow shaft, a driven member including a drum, a clutch including discs rotatable with and relative to each other and axially movably and non-rotatively connected to the drum and the shaft, respectively, a disc pressure ring, means biasing the ring to pressure release position, a clutch operating member telescoping the shaft having a cylindrical portion and short and long steps of high and low angularity to the shaft axis, said cylindrical portion and said long step corresponding to the declutched and clutched conditions, respectively, of the clutch, lever carrier means on the shaft, levers each pivoted on the carrier means between an arm of the lever adapted to press the pressure ring and an arm of the lever carrying a roller adapted to roll along said steps, means biasing the operating member axially and normally locating the rollers on said cylindrical portion, a coupling axially movable in the shaft connected to the operating member, a bearing carried by the coupling axially movable relative thereto and including a non-rotative element, spring means between said bearing and the coupling, and clutch actuating means including a rod connected to said element, and electro-responsive means including a stationary pole element and a non-rotative axially movable armature fixed to the rod the pull on said armature exceeding the load on said spring means and the arrangement causing the pull on said armature to be at a maximum when said pull exceeds said spring means thereby causing said armature to remain home irrespective of voltage variations within predetermined limits of said electro-responsive means.

LEONARD OCHTMAN.

REFERENCES CITED

The following references are of record in the file of this patent:

UNITED STATES PATENTS

| Number | Name | Date |
|---|---|---|
| 610,879 | Nesbitt | Sept. 13, 1898 |
| 710,795 | Moser | Oct. 7, 1902 |
| 901,729 | Niessner | Oct. 20, 1908 |
| 1,255,864 | Crowley, Jr. | Feb. 12, 1918 |
| 1,720,989 | Ahlm | July 16, 1929 |
| 1,878,149 | Johnston | Sept. 20, 1932 |
| 1,998,986 | Foster | Apr. 23, 1935 |
| 2,023,772 | Russo | Dec. 10, 1935 |
| 2,071,634 | Irgens | Feb. 23, 1937 |
| 2,244,169 | Miller | June 3, 1941 |
| 2,278,960 | Wilson | Apr. 7, 1942 |
| 2,319,123 | Gamble | May 11, 1943 |
| 2,360,488 | Garman | Oct. 17, 1944 |
| 2,398,330 | Rueb | Apr. 9, 1946 |
| 2,405,642 | Corte | Aug. 13, 1946 |
| 2,408,993 | Nardone | Oct. 8, 1946 |

FOREIGN PATENTS

| Number | Country | Date |
|---|---|---|
| 550,261 | Great Britain | Dec. 31, 1942 |